United States Patent
Staiger

(10) Patent No.: US 7,349,844 B2
(45) Date of Patent: Mar. 25, 2008

(54) MINIMIZING RESOURCE CONSUMPTION FOR SPEECH RECOGNITION PROCESSING WITH DUAL ACCESS BUFFERING

(75) Inventor: Dieter Staiger, Weil im Schonbuch (DE)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 10/660,445

(22) Filed: Sep. 11, 2003

(65) Prior Publication Data

US 2004/0054532 A1 Mar. 18, 2004

(30) Foreign Application Priority Data

Mar. 14, 2001 (EP) ................... 01106231
Feb. 15, 2002 (WO) .............. PCT/EP02/01636

(51) Int. Cl.
*G10L 15/28* (2006.01)
(52) U.S. Cl. .................. 704/231; 704/236; 711/147
(58) Field of Classification Search ........... 704/231, 704/246, 251, 236, 270; 711/147
See application file for complete search history.

(56) References Cited

U.S. PATENT DOCUMENTS

| | | | |
|---|---|---|---|
| 5,577,165 A | | 11/1996 | Takebayashi et al. |
| 5,774,854 A | | 6/1998 | Sharman |
| 5,960,399 A | * | 9/1999 | Barclay et al. .......... 704/270.1 |
| 6,339,804 B1 | * | 1/2002 | Shimoda et al. ............... 710/68 |
| 6,356,545 B1 | * | 3/2002 | Vargo et al. ................. 370/355 |
| 6,411,925 B1 | * | 6/2002 | Keiller ........................ 704/200 |
| 6,535,850 B1 | * | 3/2003 | Bayya ........................ 704/239 |
| 6,711,536 B2 | * | 3/2004 | Rees .......................... 704/210 |
| 6,772,117 B1 | * | 8/2004 | Laurila et al. .............. 704/233 |
| 6,865,536 B2 | * | 3/2005 | Jochumson .............. 704/270.1 |
| 7,054,819 B1 | * | 5/2006 | Loveland .................... 704/273 |

OTHER PUBLICATIONS

Hauenstein A; A VLSUI Architecture for Automatic Speech Recognition On Large Vocabularies; Circuits and Systems, 1992.
"Minimizing Power Consumption In Microprocessor Based Systems Which Utilize Speech Recognition Devices" IBM Technical Disclosure Bulletin, vol. 37, No. 10, pp. 151-153.

* cited by examiner

Primary Examiner—Martin Lerner
(74) Attorney, Agent, or Firm—Ricahrd M. Goldman

(57) ABSTRACT

In a processor system for audio processing, such as voice recognition and text-to-speech, a dedicated front-end processor, a core processor and a dedicated back-end processor are provided which are coupled by dual access stack. When an analog audio signal is inputted core processor is invoked only when a certain amount of data is present in the dual access stack. Likewise the back-end processor is invoked only when a certain amount of data is present in the dual access stack. This way the overall processing power required by the processing task is minimized as well as the power consumption of the processor system.

20 Claims, 2 Drawing Sheets

MINIMIZING RESOURCE CONSUMPTION FOR SPEECH RECOGNITION PROCESSING WITH DUAL ACCESS BUFFERING

FIELD OF THE INVENTION

The present invention relates to a method and processor system for processing of audio signals for the purpose of speech processing, in particular speech recognition and speech generation.

BACKGROUND OF THE INVENTION

Speech recognition technology has been available for over twenty years. Over the past years speech recognition technology has dramatically improved, particularly with speech dictation or "speech to text" systems such as those marketed by International Business Machines Corporation (IBM) and Dragon systems. An example for such a voice recognition and "text to speech" software product is the IBM Via Voice program which runs on a standard personal computer, such as under the windows operating system or other operating systems.

On the other hand the more universal application of speech recognition is input to computers and other electronic control systems for example to input commands or to control a process or machine. For example, a user may navigate through a computer's graphical user interface by the user speaking the commands which are customarily found in the systems menu text, icons, labels, buttons, etc.

The latter aspect is of particular importance for controlling portable devices, such as mobile phones, personal digital assistants or palm top computers.

A further important field of application is in the automotive field. For example a car radio can be equipped with speech recognition such that the driver can select a radio station by means of speech control. As a further example in the field of automotive control commands for switching the lights on, activating the window opener or similar functions can be inputted into the automotive control system by means of natural voice.

With the advent of internet and multimedia applications and the integration of entertainment and communication into the car electronic this field of speech recognition is becoming more important.

U.S. Pat. No. 5,602,963 shows a handheld electronic personal organizer which performs voice recognition on words spoken by a user to input data into the organizer and which records voice messages from the user. The spoken words and the voice messages are input via a microphone. The voice messages are compressed before being converted into digital signals for storage. The stored digital voice messages are reconverted into analog signals and then expanded for reproduction using a speaker. The organizer is capable of a number of a different functions, including voice training, memo record, reminder, manual reminder, timer setting, message review, waiting message, calendar, phone group select, number retrieval, add phone number, security, and "no" logic. During such various functions, data is principally entered by voice and occasionally through use of a limited keypad, and voice recordings are made and played back as appropriate.

U.S. Pat. No. 5,706,399 discloses a speech controlled vehicle alarm system. The system allows control of alarm functions to be accomplished using specific spoken commands. A microphone converts speech into time-variant voltage levels which are amplified and sent to a analog-to-digital converter and digitised. The digitised data is then processed by a speech recognition subsystem.

The speech recognition subsystem separates extraneous speech from words and provides corresponding output signals when control words are recognized. The output signals are employed by the alarm system to operate door locking and unlocking controls, to operate a loud audible siren and/or horn, to operate vehicle light controls, to provide engine cut-off control, to provide engine starting control or to operate a response indicator incorporated in the main alarm processing unit. The response indicator provides verbal responses to confirm spoken commands.

U.S. Pat. No. 5,745,874 shows a pre-processor for automatic speech recognition. The pre-processor is based upon auditory modelling and includes a tapped delay line and a neural network in the form of a multilayer perceptron. The tapped delay line receives an analog speech signal and provides multiple time delayed samples thereof in parallel as inputs for the neural network. The single analog output of the neural network is suitable for interfacing with a signal processor for further processing of the speech information using spectral signal analysis so as to provide a speech representation with desirable characteristics of an auditory based spectral analysis model while simultaneously maintaining a standard analog signal interface.

U.S. Pat. No. 5,960,394 discloses a method of speech command recognition for converting spoken utterances into either text or commands. The system runs on a platform capable of running a plurality applications. Text and commands are sent from a word recognition application to one or more user applications. In addition, information pertaining to the state of the user applications is sent back to the word recognition application. Word recognition probabilities are modified based the information received from the user applications.

U.S. Pat. No. 6,192,343 shows a speech command input recognition system which interprets speech queries such as help queries and presents a list of relevant proposed commands sorted in order based upon relevance of the commands. The system also provides for adding terms to previous speech terms.

A common shortcoming of the prior art speech processing system is the required processing power and memory access bandwidth. The processing power provided by standard microprocessors, such as the Intel Pentium processor family, is sufficient for speech processing applications.

However the parallel execution of other application programs in the personal computer can be considerably slowed down when a speech recognition system is used as the speech recognition system requires a substantial amount of the available processing capacity. At the same time this may imply that the speech recognition system does not perform to the satisfaction of the user.

On the other hand there is a variety of applications where the usage of such high performance standard microprocessors is not desirable for a number of reasons. Firstly, the price of adding an additional processor for the speech recognition can be unacceptably high. Secondly, in the case of portable electronic devices the power consumption of an additional high performance processor can drastically reduce battery lifetime.

It is therefore an object of the present invention to provide an improved method and processor system for the processing of audio signals.

SUMMARY OF THE INVENTION

The object of the invention is solved by applying the features of the respective independent claims. Preferred embodiments of the invention are given by the dependent claims.

The invention is advantageous in that it allows to optimise the voice recognition performance by avoiding peak processing demand and avoiding bottleneck effects experienced by standard processing systems.

A further advantage is that the invention allows to minimize energy consumption for the overall voice recognition and text to speech system solution which is a pre-condition for building highly efficient mobile devices with audio signal processing systems. The invention allows to significantly reduce the overall system power consumption and thus enables battery powered handheld electronic devices to perform for an extended time on a single battery charge.

In accordance with a preferred embodiment the energy consumption is further reduced by selectively applying a clocking signal to the front-end, application program and/or back-end processing component.

The present invention can be implemented without additional cost and has a potential for realizing a cost advantage as it allows to use a lower cost processor with reduced power and cooling requirements.

BRIEF DESCRIPTION OF THE DRAWINGS

The present invention will be better understood and its objects and advantages will become more apparent to those skilled in the art by reference to the following drawings, in conjunction with the accompanying specification, in which.

DETAILED DESCRIPTION OF THE INVENTION

Figure 1:
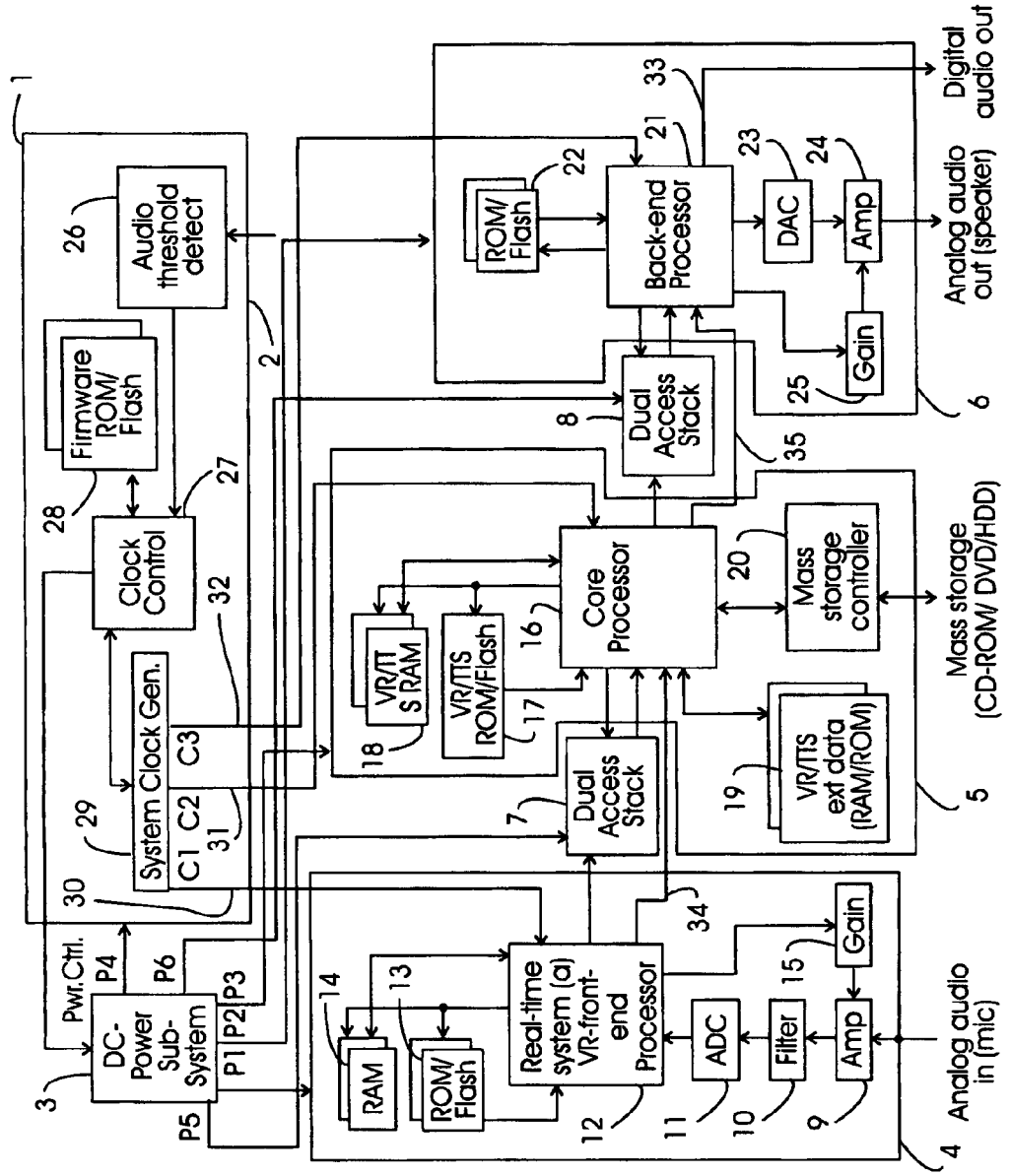
FIG. 1 is a block diagram of an embodiment of a processor system in accordance with the invention.

FIG. 1 shows a processor system 1 having a clock circuitry 2, a power sub-system 3, front-end processor system 4, core processor system 5, back-end processor system 6 and dual access stacks 7 and 8.

The front-end processor system 4 has an audio amplifier 9 for receiving an analog signal produced by a microphone. The audio amplifier 9 is connected to a filter 10 for filtering the analog audio signal. The output of the filter 10 is connected to analog to digital converter 11. The analog to digital converter 11 has its output connected to the front-end processor 12.

The front-end processor 12 is connected to non-volatile memory 13 which contains the program instructions for the front-end processor 12. Further the front-end processor 12 is connected to the random access memory 14 which is used by the front-end processor 12 for the purposes of data processing.

The front-end processor 12 has an output which is coupled to gain control 15 for controlling the gain of the audio amplifier 9.

Further the front-end processor 12 is coupled to the dual access stack 7. The dual access stack 7 is a memory device having two input/output ports for performing asynchronous read/write operations such as a dual ported RAM or FIFO.

The core processor system 5 has a core processor 16 which is coupled to the dual access stack 7. Further the core processor 16 is connected to the ROM/Flash memory 17 and the static RAM memory 18. The memories 17 and 18 contain data which are used for the voice recognition (VR) and for the text to speech (TTS) processing.

The core processor 16 is further coupled to random access memory 19 and to mass storage controller 20 for accessing an external mass storage device such as the CD-ROM, DVD or HDD.

Further the core processor 16 is coupled to dual access stack 8. The dual access stack 8 is coupled to the back-end processor 21. The back-end processor 21 is connected to a non-volatile memory 22 which stores the program to be executed by the back-end processor 21. Further the back-end processor 21 is connected to a digital to analog converter 23 to supply an analog signal to the amplifier 24. The output of the amplifier 24 provides an analog audio signal which is supplied to a speaker.

In addition the back-end processor 21 has a digital output 33 to supply a digital audio outsignal.

Further the back-end processor 21 is coupled to gain control 25 for controlling the gain of the amplifier 24.

The input signal of the amplifier 9 is also supplied to audio threshold detector 26. The audio threshold detector 26 is coupled to clock control 27. Clock control 27 is connected to the non-volatile memory 28 which stores the program to be carried out by the clock control 27. Clock control 27 has an output connected to the power sub-system 3 and to system clock generator 29.

The system clock generator has three clock outputs C1, C2 and C3. The clock C1 is supplied to the front-end processor 12 via line 30; the clock C2 is supplied to the core processor 16 via line 31 and the clock C3 is supplied to the back-end processor 21 via line 32.

The power sub-system 3 receives at its input a power control signal from the clock control 27. The power sub-system produces power signals P1 to P6 which are supplied to the front-end processor system 4, the back-end processor system 6, the core processor system 5, the clock circuitry 2, the dual access stack 7 and the dual access stack 8, respectively.

When no analog audio signal is present the processor system 1 is in a sleep mode with minimal power consumption. When the input of an analog audio signal is detected by the audio threshold detector 26 of the clock circuitry 2 this invokes the clock control 27.

In a first step the clock control 27 directs the system clock generator 29 to generate only the clock signal C1 in order to invoke the front-end processor 12. Likewise the power sub-system 3 is triggered by the clock control 27 to increase the power supplied via the power outputs P1 to P6 to bring the processor system 1 out of the sleep mode.

The analog audio signal is provided to the front-end processor 12 after it has been amplified by audio amplifier 9, filtered by filter 10 and converted from analog to digital converter 11. The digitised audio signal is processed by the front-end processor 12 by means of the program which is stored in the memory 13. The RAM 14 is used by the front-end processor 12 to perform the corresponding data processing operations. The data processing operation of the programs stored in the memory 13 results in a stream of output data which is buffered by the dual access stack 7.

After a certain time interval has lapsed the clock control 27 directs the system clock generator 29 to provide the clock signal C2 such that the core processor 16 is invoked. When a certain amount of data has been provided from the front-end processor 12 to the dual access stack 7 the front-end processor 12 sends a trigger signal via line 34 to the core processor 16.

In response to this the program stored in the memory 17 of the core processor 16 is started and the data which are buffered in the dual access stack 7 are read for further processing by the core processor 16. In parallel the streaming of data from the front-end processor 12 to the dual access stack 7 continues. The point of time when the trigger signal is sent out by the front-end processor can be a predetermined time interval after the first clock pulse of the clock C1 supplied by line 30. Alternatively this point of time can be determined by the data volume which has been output from the front-end processor 12 to the dual access stack 7.

Alternatively to the triggering of the core processor 16 by the trigger signal of the front-end processor 12 the core processor 16 can also check the dual access stack 7 at regular time intervals for the amount of data being buffered in the dual access stack 7. When the amount of data surpasses a predefined threshold value this invokes the operation of the program stored in the memory 17.

The data processing operations performed by the core processor 16 results in an output stream of data which is buffered by the dual access stack 8. After a certain time interval the clock control 27 directs the system clock generator 29 to also supply the clock signal C3 such that the back-end processor 21 is also invoked.

After the core processor 16 has outputted a certain amount of data to the dual access stack 8 it sends a trigger signal via line 35 to the back-end processor 21. The receipt of the trigger signal via line 35 starts the execution of the program stored in memory 22 of the back-end processor 21. In response to this the back-end processor 21 reads the data which is buffered in the dual access stack 8 for further processing.

Alternatively the execution of the program stored in the memory 22 is invoked when the amount of data stored in the dual access stack 8 has reached or surpasses a certain predefined threshold level. For this purpose the amount of data stored in the dual access stack 8 is checked at regular time intervals by the back-end processor 21.

The result of the back-end processing is output by the back-end processor 21 to the digital to analog converter 23 which produces an analog output signal which is amplified and output by the amplifier 24.

When the amount of data stored in the dual access stack 7 falls below a predefined threshold level the execution of the program of memory 17 in the core processor 16 is stopped in order to save power. The same applies correspondingly with respect to the dual access stack 8 and the back-end processor 21.

When the dual access stack 7 is refilled to a level equal to or above the first threshold level this again triggers the execution of the program 17. Again the same applies correspondingly with respect to the dual access stack 8 and the back-end processor 21.

This way a considerable amount of battery power and processor resources is saved. This allows the utilization of a smaller core processor 16 and/or to use the core processor 16 for a variety of other application programs such as text processing, control functions/or communication functions at the same time.

Figure 2:
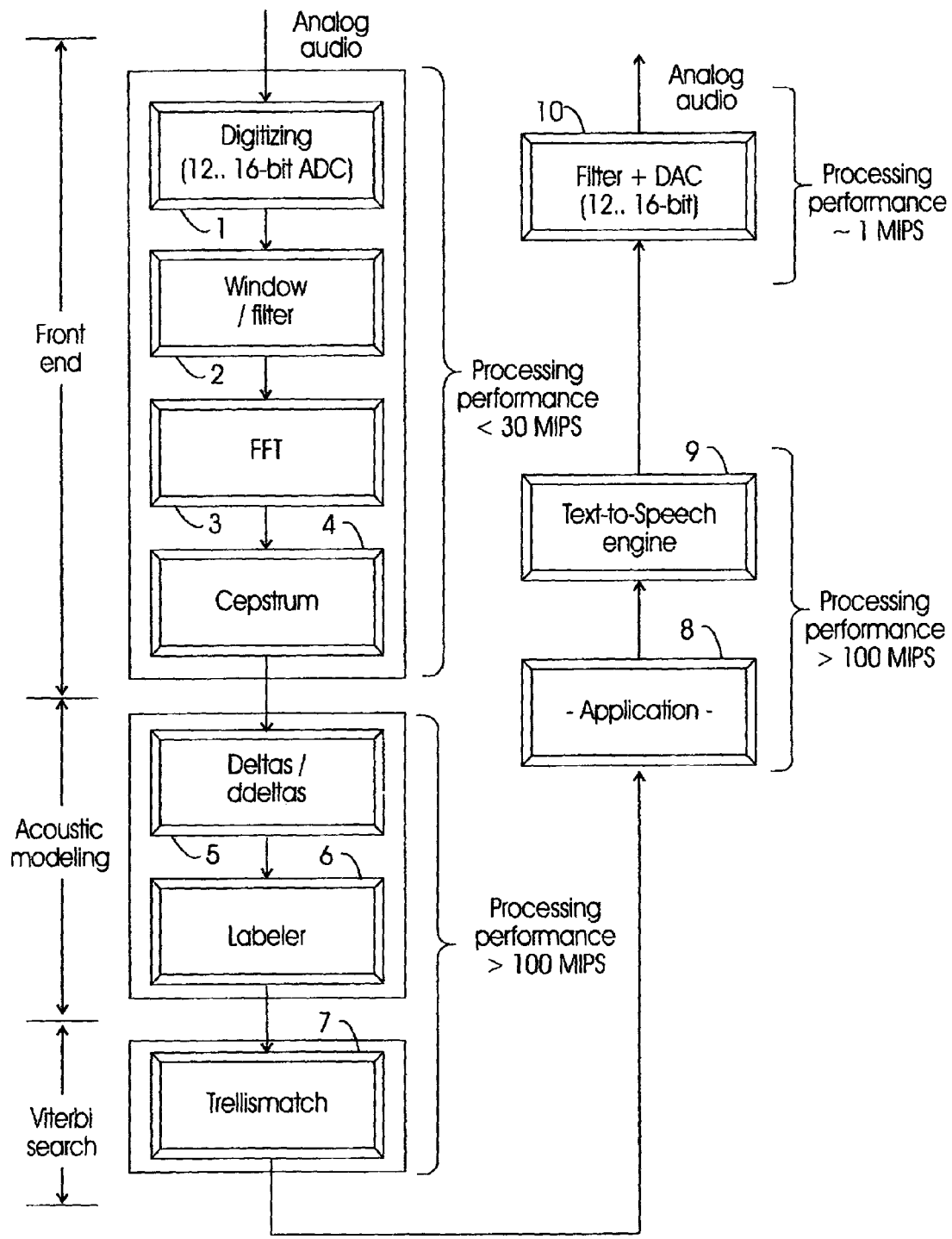
FIG. 2 is a flow chart illustrating the operation of the processor system of FIG. 1.

With respect to FIG. 2 now the operation of the processor system 1 of FIG. 1 is illustrated in greater detail with respect to voice recognition and text to speech. In step 1 the incoming analog audio signal is digitised. In step 2 the digitised audio signal is filtered. In step 3 the filtered and digitised audio signal is transformed in the frequency domain by means of a fast fourier transformation (FFT). A cepstrum is calculated in step 4.

The steps 1 to 4 are carried out by the front-end processor system and require a processing performance of about lesser than 30 million operations per second (MIPS).

The output cepstrum data are buffered in the dual access stack 7 (cf. FIG. 1). When a sufficient amount of cepstrum data has been stored in the dual access stack 7 the operation of the core processor 16 starts.

The core processor 16 performs the acoustic modeling consisting of the steps 5 "deltas/ddeltas" and step 6 "labeler". In the next step 7 a Viterbi search algorithm is performed applying a trellis match comparison function finally identifying the best word matching the phone-frames and the associated acoustic contents.

The acoustic modeling together with the Viterbi search are representing the most performance demanding section of the entire voice recognition algorithm requiring processing performance of above 100 MIPS. This indicated performance demand is valid for today's voice recognition algorithms for example defined for an active vocabulary of 500 words. An increase of the vocabulary will extend the demand on performance even more.

The result of the speech recognition provided by step 7 are input into an application program 8. The application program 8 can be a graphical user interface, a text processing system, a communication or control program or any other application requiring a user input.

Based on the user input as recognized by the speech recognition of steps 1 to 7 the application program generates a textual output. The textual output is processed by a text-to-speech engine in step 9. The steps 8 and 9 again require a processing performance above 100 MIPS.

The text-to-speech engine provides a digital output signal to the back-end system. The back-end processor system is invoked when a certain amount of data has been output by the text-to-speech engine. When the back-end processor system is invoked it performs a filter and digital to analog conversion operation on the digital data signal provided by the text-to-speech engine 9. This way in step 10 an analog audio signal is provided to the user. For step 10 a processing performance in the order of 1 MIPS is required.

While the invention has been described with respect to certain preferred embodiments and exemplifications, it is not intended to limit the scope of the invention thereby, but solely by the claims appended hereto.

The invention claimed is:

1. A processor system for speech recognition processing of an audio signal, the processor system comprising:
    a) front-end processing means for preprocessing of the audio signal and for generating an output of first data,
    b) core processing means for performing speech recognition processing on the first data,
    c) dual access storage means for buffering of the first data, the dual access storage means being coupled between the front-end processing means and the core processing means,
    d) means for invoking the core processing means for performing the speech recognition processing after a time interval following a start of the preprocessing by the front-end processing means,
    e) means for stopping the execution of the speech recognition processing by the core processing means when the amount of first data stored in the dual access storage means falls below a predefined threshold level, f) means for triggering the execution of the speech recognition processing by the core processing means when the dual access storage means is refilled by first data to or above the threshold level.

2. The processor system of claim 1 further comprising audio threshold detection means for invoking the front-end processing means when the audio signal surpasses an audio threshold level.

3. The processor system of claim 1 the time interval being a predetermined time interval, the start of the predetermined time interval being defined by the start of the operation of the front-end processing means and/or by the point of time when the audio signal surpasses a predefined threshold level.

4. The processor system of claim 1 the time interval being determined by a second point of time when the amount of first data being stored in the dual access storage means reaches a second predefined threshold level.

5. The processor system of claim 1 the dual access storage means being a dual ported FIFO or a dual ported RAM.

6. The processor system of claim 1 further comprising clock control means for controlling a first clock signal supplied to the front-end processing means and for controlling a second clock signal supplied to the application program processing means, the clock control means being adapted to invoke the second clock signal the time interval after the first clock signal has been invoked.

7. The processor system of claim 1 the front-end processing means being adapted to calculate a cepstrum and the application program processing means being adapted to perform a speech recognition based on the cepstrum provided by the front-end processing means.

8. The processor system of claim 1, the processor system further comprising:
a) second dual access storage means for buffering of output data being generated by the core processing means by performing the speech recognition processing,
b) back-end processing means being coupled to the second dual access storage means for back-end processing of the output data,
c) means for invoking the back-end processing means after a time interval after a start of the processing of the application programming processing means.

9. The processor system of claim 8 the time interval being a predetermined time interval.

10. The processor system of claim 8 the time interval being determined by a threshold level of the amount of output data.

11. The processor system of claim 9 further comprising clock control means for controlling a first clock signal supplied to the core processing means and for controlling of a second control signal supplied to the back-end processing means, the clock control means being adapted to invoke the second clock signal the time interval after the first clock signal.

12. The processor system of claim 9 the core processing means comprising speech engine means and the back-end processing means comprising filter means.

13. A method for processing of an audio signal, the method comprising the steps of:
a) invoking of front-end processing means for preprocessing of the audio signal and for generating an output of first data,
b) buffering of the first data in a dual access storage means,
c) invoking of core processing means being coupled to the dual access storage means for speech recognition processing of the first data a time interval after the front-end processing means has been invoked,
d) stopping the execution of the speech recognition processing by the core processing means when the amount of first data stored in the dual access storage means falls below a predefined threshold level,
e) triggering the execution of the speech recognition processing by the core processing means when the dual access storage means is refilled by first data to a level equal to or above the threshold level.

14. The method of claim 13 whereby the time interval is a predetermined time interval.

15. The method of claim 13 the time interval being determined by an amount of first data in the dual access storage means.

16. The method of claim 13 further comprising selectively applying a first and a second clock signal to the front-end processing means and the application program processing means, respectively, for sequentially invoking the front-end processing means and the application program processing means.

17. The method for speech recognition processing of an audio signal of claim 13, the method further comprising the steps of:
a) buffering of second data outputted by the core processing means as a result of the speech recognition processing in second dual access storage means,
b) invoking back-end processing means for back-end processing of the second data after a time interval after the core processing means has been invoked, the back-end processing means being coupled to the second dual access storage means.

18. The method of claim 17 the time interval being a predetermined time interval.

19. The method of claim 17 the time interval being determined by an amount of first data in the dual access storage means.

20. The method of claim 13 further comprising selectively applying a first and a second clock signal to the front-end processing means and the core processing means, respectively, for sequentially invoking the front-end processing means and the core processing means.

* * * * *